United States Patent [19]

La Riviere et al.

[11] Patent Number: 5,058,913

[45] Date of Patent: Oct. 22, 1991

[54] SELF-LOCKING BICYCLE WHEEL SAFETY RETAINER MOUNT

[76] Inventors: Alexander La Riviere, 1565 Mackey Ave., San Jose, Calif. 95125; Jorge Sousa, 130 Cheltenham Way, San Jose, Calif. 95139

[21] Appl. No.: 568,931

[22] Filed: Aug. 17, 1990

[51] Int. Cl.$^5$ ............................................. B62K 19/30
[52] U.S. Cl. ................................. 280/281.1; 280/288; 474/116
[58] Field of Search ...................... 280/279, 288, 281.1

[56] References Cited

U.S. PATENT DOCUMENTS 1,024,216  4/1912  McKellar ........................... 280/288

FOREIGN PATENT DOCUMENTS 505470  9/1951  Belgium ............................. 280/288
440517 10/1948  Italy ................................... 280/288

*Primary Examiner*—Mitchell J. Hill

[57] ABSTRACT

A self-locking safety retaining mount for use with bicycles utilizing quick-release hubs for front wheel mounting. The mount comprises a left and right configured pair of devices, each of which provides positive closure of the open-ended axle receiving slot in the dropout at the end of each leg of the front forks of a bicycle by rotating a positive barrier load-bearing surface latch across the end of the axle receiving slot. The latch is retained in the closed position by the forces exerted by an accidentally loosened or undertightened hub on the load-bearing surface formed by the closed latch in cooperation with a pivot.

8 Claims, 4 Drawing Sheets

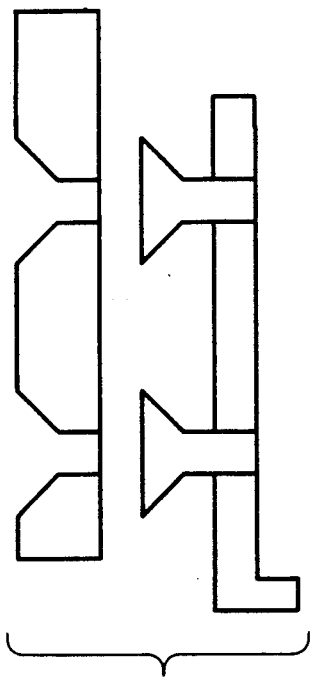
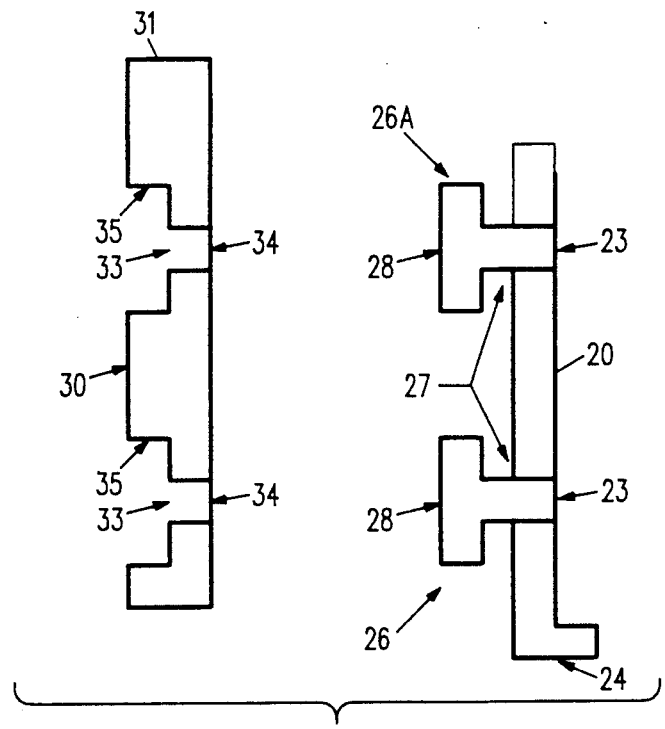
FIG. 9A  FIG. 9B
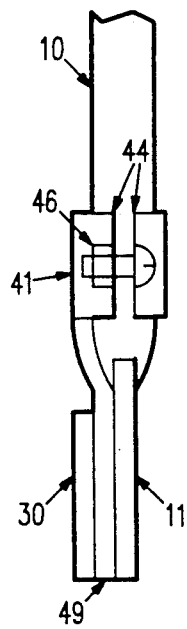
FIG. 10
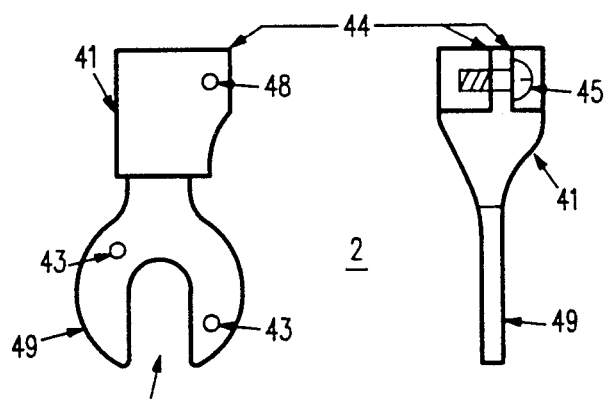
FIG. 11  FIG. 12

SELF-LOCKING BICYCLE WHEEL SAFETY RETAINER MOUNT

BACKGROUND OF THE INVENTION

The present invention relates generally to bicycles, and more particularly to the mounting of front wheel quick-release hubs. Specifically, the present invention provides a self-locking safety retaining wheel mount for use with front wheel quick-release wheel mounting hubs. The mount of the present invention is particularly useful for use on front forks that were not originally designed to retain the front wheel in the event the quick-release hub was undertightened.

It is well known in the present day bicycle technology to utilize quick-release mounting devices or hubs for attaching the front wheel to each leg end piece of the bicycle front fork. Such end pieces are hereinafter referred to as a dropout, and will be understood to be either singular or plural. The use of quick-release mounts is popular in racing and touring bicycles as they facilitate convenient removal of the wheel for repair. However, concomitant with the convenience of quick-release hubs is the danger that they may be accidentally loosened, improperly installed or inadequately secured, and subsequently disengage from the bicycle, with disastrous results for both bicycle and rider. Since many of the designs for dropouts provide no means to keep the wheel attached to the forks in the event the quick-release hub is undertightened, many devices have been proposed to prevent a quick-release mounted front wheel from separating from the bicycle while riding.

U.S. Pat. No. 3,807,761 (Brilando, et al) discloses a safety clip which is mounted to the dropout on each leg of the fork by a lock washer and bolt inserted into a specially threaded aperture in the dropout. In use, the clip is positioned so as to close the opening of the front fork dropout axle slot, retaining the wheel axle in case of unintentional release of the quick-release hub. This unit requires that the dropout be modified by drilling and tapping a hole so that the mounting screw can be installed. Special tools, training and skills, typically beyond the level of the general consumer, are required for this installation. An adult of normal intelligence and ability would foreseeably have difficulty installing this safety device. Thus, the general consumer would not be expected to be able to install this device and would have to rely on the skills of a professional mechanic for such installation.

U.S. Pat. No. 4,711,459 (Liu) discloses hub retention devices which are mounted on each end of the axle quick-release hub assembly and pivots to engage a protrusion on the dropout. The protrusions disclosed by Liu typically include threaded apertures for receiving a bolt for securing fender struts and other accessories common on some, but not always found on, bicycle dropouts. The device disclosed by Liu further must be used with dropouts modified with an appropriate stud and with a wheel configured with the modified quick-release. Moreover, these latches are held securely when the quick-release hub is tightened but is free to move under inertial forces if the quick-release hub is loosened or undertightened. If the hub is loosened by the forces resulting from a collision or riding over rough terrain, the device may also move due to those same forces from the secured to an unsecured position and allow the wheel to separate from the bicycle. The skills required to properly install these safety latches exceed the level of skill of the general consumer; there is no positive preset locking position for the latches; and they can easily be installed incorrectly. In the event only one of the latches is securely tightened, the wheel still may disengage under inertial forces.

U.S. Pat. No. 4,103,922 (Brilando) discloses a pair of flexible retainer clips which mount on the end of the axle and are secured to each leg of the bicycle front fork by inserting a stud attached on the bicycle fork leg into an aperture in the clip. To release the wheel, the clip is forced off the stud, separated from the fork legs and moved aside, allowing the wheel to be removed from the fork. The bicycle front fork legs must be precisely modified or manufactured with the stud in the correct position on each leg for receiving the clip. The modification would require professional service to install. This special modification precludes use of the clip on an unmodified fork, for example when changing the wheel from one bicycle to another. This type of safety device requires mechanical skill beyond the level of skill of the general consumer and an adult of normal intelligence and ability would foreseeably have difficulty installing this safety device correctly.

U.S. Pat. No. 3,894,751 (Fuhrman, et al.) discloses retaining clips for retaining a bicycle front wheel in case of accidentally loosened wheel mounting nuts. The retaining clips are not useable with quick-release hubs however as said hubs do not provide sufficient clearance for the retaining clips to be removed, thereby not allowing the wheel to be removed from the dropouts without fully removing the quick-release hubs from the axle. This design would defeat the purpose of the quick-release unit, namely, to easily and conveniently remove the wheel. Neither Fuhrman and Zachert nor Fritz suggest means whereby their respective disclosures could be adapted to use with quick-release hubs.

The causes of inadvertent separation of the wheel from the bicycle generally form three groups: collisions, road hazards and inadequate mount design. The first refers to collisions by the rider with either stationary objects or other riders or vehicles. This is most commonly found in crowded areas, such as urban districts of cities, and in racing where many riders are crowded into limited space. In this case the handles of a quick-release hub may be caught by a portion of another bicycle, thereby releasing the hub and allowing the dislodgment of the wheel from the bicycle.

The second group is common to both racing and touring by bicycle, especially off-road touring. Hitting a hole or bump in the pathway could exert substantial force on the wheel mounting hub, thereby jarring it loose and allowing the wheel to separate from the dropout and causing the rider to fall and possibly be injured.

The final group refers to a wheel mounting apparatus that, by its design, requires some mechanical aptitude and strength or dexterity to properly operate. If the rider is a diminutive individual, such as a child, secure fastening of the wheel may not be achieved. Such an inadequately tightened or improperly fastened wheel could lead to accidental separation of the wheel from the bicycle under normal riding conditions, possibly leading to injury of the rider and product liability claims against the manufacturer since this potential misuse by the customer is foreseeable by the manufacturer.

A reliable safety device which is quick and easy to operate by any individual under all conditions such as racing or touring in all weather conditions is therefore desirable for use with quick-release hubs.

SUMMARY OF THE INVENTION

The present invention comprises a pair of self-locking wheel mounts for use with quick-release hubs commonly available for front wheels of bicycles. The mounts may be easily attached to each leg of a bicycle front fork end piece or dropout by anyone capable of using a simple wrench. Once installed on the dropout of each leg of the bicycle fork, the mounts are easily opened by hand for installation and removal of a wheel but cannot be jarred open even under the most rigorous riding conditions. The mount relies on a self-locking design to provide a mount from which the wheel axle cannot separate rather than spring-loaded or tightened pivots as found in the prior art. This allows proper wheel installation without use of extraordinary strength, dexterity or additional tools. It is not necessary to modify the dropout or fork in any way to properly install the retainer mount of the present invention.

The unique double plate construction provides a positive retaining latch by closing the end of the front fork open-ended axle receiving slot 12, hereinafter referred to as axle slot 12, barring escape of the axle with a load-bearing surface of the retaining latch. The retaining latch is positioned relative to a pivot such that pressure on the closed latch load bearing surface by an accidentally loosened axle retains the mount in a securely closed position and axle in place. The large handle provides a secure grip under adverse conditions so that a rider changing a wheel need not be delayed or impeded by the need for tools or fumbling to open the latch, and provides space for a printed warning or instruction regarding operation.

The safety retainer mount for quick-release hubs according to the present invention is designed so that it can be installed by an adult of average intelligence and ability. Thus, many of the dropouts that are already on the market or in use are made safe without having to modify either the dropout or the forks in any way.

DESCRIPTION OF THE DRAWING

For fuller understanding of the present invention, reference is made to the accompanying drawing in the following detailed Description Of The Preferred Embodiment of the invention. In the drawing:

FIG. 9a is an exploded side view of a first embodiment of the safety retainer mount of the present invention.

FIG. 9b is an exploded view of a second embodiment of the safety retainer mount of the present invention.

FIG. 10 is a side view of a bicycle front fork leg dropout having a self-locking mount according to the principles of a second embodiment of the present invention installed.

FIG. 11 is a front view of the mounting plate of FIG. 10.

FIG. 12 is a side view of said mounting plate of the mount of FIG. 10.

DETAILED DESCRIPTION OF THE PREFERRED EMBODIMENT

Figure 1:
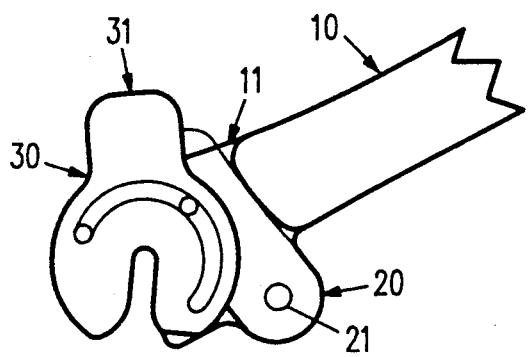
FIG. 1 is a perspective view of a bicycle front fork leg dropout having a self-locking mount according to the principles of the present invention installed and in the open position.

Referring to FIGS. 1 through 8, a self-locking bicycle wheel mount in accordance with the present invention is shown. The following discussion refers to the mount in the singular but should be understood to refer to a pair of mounts, manufactured in a left and right configuration, to be attached, respectively, to or near the dropouts on the left and right legs of a bicycle front fork.

The present invention is designed primarily for use with quick-release hubs. A typical example of such a hub is illustrated and described in detail in U.S. Pat. No. 3,807,761 which is incorporated by reference as if fully set forth herein. The design of quick-release hubs forms no part of the present invention.

To attach the mount to dropout 11 of front fork leg 10, mounting plate 20 is affixed to dropout 11 by a suitable bolt (not shown) passing through mounting aperture 21 and screwed tightly into threaded hole 13. Threaded hole 13 in dropout 11 is of a standard size and placement common in the art for mounting fenders or other accessories to the front forks of bicycles. It should be noted that use of the self-locking mount of the present invention does not preclude also mounting such fenders and accessories.

Figure 2:
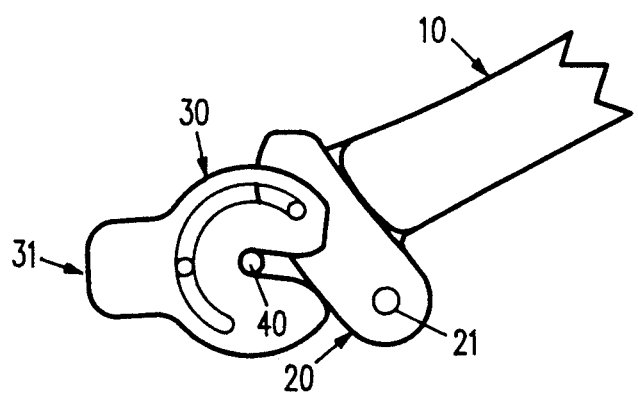
FIG. 2 is a perspective view of a bicycle front fork leg dropout having a self-locking mount according to the principles of the present invention installed and in the closed position.
Figure 3:
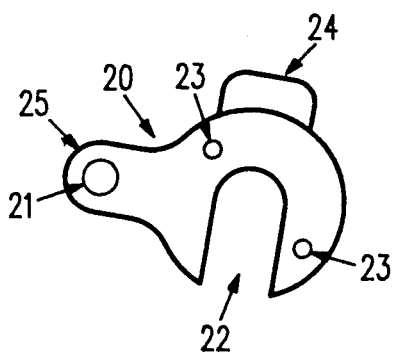
FIG. 3 is a view of front of the mounting plate of the mount of FIG. 2.
Figure 4:
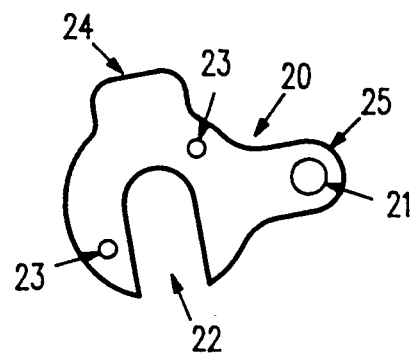
FIG. 4 is a view of the reverse of the mounting plate of FIG. 3.

To operate the mount, latching plate handle 31 is grasped and latching plate 30 is rotated until open-ended axle slot 32 of latching plate 30 is aligned with open-ended axle slot 22 of mounting plate 20 and open-ended axle slot 12 of dropout 11. The wheel axle is inserted into the resulting open-ended axle slot and the latching plate 30 is rotated to the closed position as shown in FIG. 2. Closing latching plate 30 captures the end of the mounting stud or rod of the quick-release hub in closed aperture 40 as described hereinbelow. The quick-release hub (not shown) is then tightened in the normal manner, securing the wheel to the bicycle. To remove the wheel, the mounting steps are performed in the reverse order.

Figure 7:
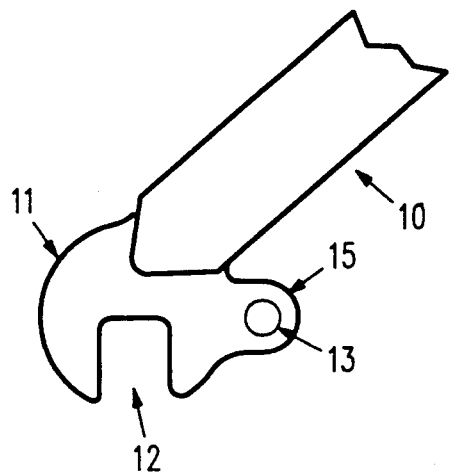
FIG. 7 is a view of a typical bicycle front fork leg with integral dropout (Prior art).
Figure 8:
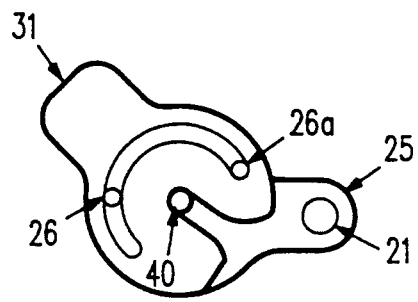
FIG. 8 is a front view of an assembled self-locking mount.

Referring now to FIG. 7, typical front fork leg 10 having dropout 11 is shown. Lobe 15 having threaded hole 13 is commonly provided for attachment of accessories. Hole 13 may be unthreaded as well, requiring the present invention to be attached with a suitable bolt and nut. Open-ended axle slot 12 receives the axle of the front wheel. The preferred embodiment of the present invention may be used with any bicycle having these features, which are both common and standard among many manufacturers of bicycles and parts therefor. An alternative embodiment for use with dropouts without lobe 15 is described hereinbelow.

FIGS. 3 through 6 and 8, show the assembly of a self-locking mount according to the present invention. Mounting plate 20 is typically one-eighth inch thick and preferably fabricated of stainless steel. High strength aluminum also may be used. The plates may be polished, anodized or plated as desired.

The external shape of mounting plate 20 is essentially circular with lobe 25 extending therefrom and generally approximates the size and shape of dropout 11. Lobe 25 extends to cover lobe 15 of dropout 11 having hole 13 therethrough. Aperture 21 is typically one-fourth inch in diameter and is positioned to align with threaded hole 13 in dropout 11 while aligning open-ended axle slot 22 of mounting plate 20 with axle slot 12 of dropout 11. Rotation stop 24 fits over the edge of dropout 11 and further serves to correctly align the mount with open-ended axle slot 12 of dropout 11. T-shaped assembly studs 26 serve to attach latching plate 30 to mounting plate 20 and act as rotation stops to limit the arcuate travel of latching plate 30 as described hereinbelow. Assembly studs 26 may also be formed in a tapered shape, similar to a flat head bolt common in the fastening art, dimensioned to fit a tapered arcuate aperture 33 as described hereinbelow. Assembly stud 26a further serves as a fulcrum relative to load-bearing surface 35 as described hereinbelow.

Figure 5:
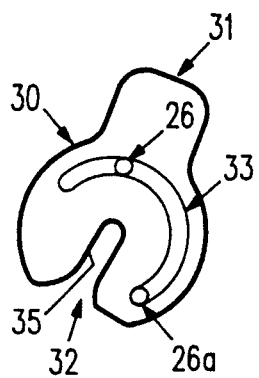
FIG. 5 is a view of the front of the latching plate of the mount of FIGS. 2, 10, 12 and 13.
Figure 6:
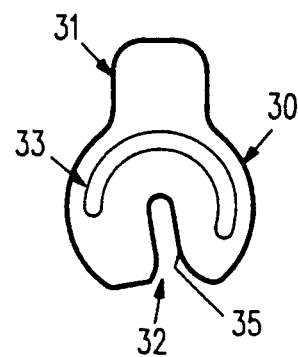
FIG. 6 is a view of the reverse of the latching plate of FIG. 5.

Latching plate 30 is typically 3/32 inch thick and fabricated of suitable material, typically, stainless steel or high strength aluminum. The plates may be polished, anodized or plated as desired. Latching plate 30 of FIGS. 5 and 6 is suitable for use with alternative embodiments as described hereinbelow with reference to FIGS. 10–14.

Latching plate 30 is provided with arcuate aperture 33 which allows limited rotation of latching plate 30 around an axis coincident with the axle of the front wheel (not shown). Aperture 33 described further hereinbelow is of universe T-shaped cross-section to accept T-shaped assembly studs 26 or may be of a tapered cross section to accept tapered assembly studs 26 as described hereinabove. Open-ended axle slot 32 of latching plate 30 is typically 3/16 inch. Open-ended axle slot 22 is typically ⅜ inch, and aligns fully with axle slots 12 and 22 in the open position and forming closed aperture 40 when latching plate 30 is rotated to the closed position. Closed aperture 40 is dimensioned to snugly accept the quick-release mounting stud. Load-bearing surface 35 closes aperture 40 and is positioned relative to assembly stud 26a which acts as a pivot so that pressure exerted by a loosened wheel axle retains latching plate 30 in the closed position by limiting rotation around assembly stud 26a.

To assemble the mount of the present invention, assembly studs 26 are inserted through arcuate aperture 33 into receiving apertures 23 in mounting plate 20. Assembly studs or rivets 26 may be of any form common in the fastening art. If they are rivets, assembly studs 26 would require a suitable shoulder on the stem. Assembly studs 26 are then affixed to mounting plate 20 by a method suitable for the design and material of which mounting plate 20 and assembly studs 26 are made. For example, the studs may be welded or press fitted. This assembly is performed during manufacture of the mount leaving only attachment of the device to dropout 11 of bicycle front fork leg 10 by the consumer as described hereinabove.

FIGS. 9a and 9b show, in exploded side view the components of the mount of the present invention. Referring first to FIG. 9a, tapered arcuate aperture 33 in latching plate 30 is dimensioned to loosely accept tapered-head assembly studs 16. Alternatively, arcuate aperture 33 may have a T-shaped cross section. Larger aperture portion 39 is dimensioned to loosely accept head 28 of tapered-head assembly studs 26 and smaller aperture portion 34 is dimensioned to loosely accept stem 27 of T-shaped assembly studs 26 as shown in FIG. 9b. In either configuration, stem 27 of assembly studs 26 is sufficiently long to pass through the smaller arcuate aperture 34 and the mounting plate 20 receiving aperture 23 and leave sufficient clearance between the latching plate 30 and the mounting plate 20 so as to allow latching plate 30 to rotate easily. Assembly in this manner secures latching plate 30 to mounting plate 20 and allows latching plate 30 to rotationally move relative to mounting plate 20. Rotation stop 24 fits over the edge of fork end piece 11 as described hereinabove.

Referring now to FIGS. 10 through 12, an alternative embodiment of a self-locking mount according to the present invention is shown. The alternative embodiment is for use on bicycles having dropout 11 without lobe 15 or hole 13 therethrough but may also be utilized, if desired, on bicycles having a dropout 11 with lobe 15 and hole 13. Mounting plate 49 is fabricated of a single piece of material, typically metal as described hereinabove, having the general shape as dropout 11 and including mounting collar 41, hereinafter referred to as collar 41 which is dimensioned to accept the leg 10 of a front bicycle fork. Collar 41 is open and provided at each edge of the opening with clamping flanges 44, hereinafter referred to as flanges 44 each having aperture 48 for accepting bolt 45 therethrough. Collar 41 surrounds leg 10 and, by tightening bolt 45 and nut 46, flanges 44 are drawn closer together thereby clampingly affixing mounting plate 49 thereto. An acceptable alternative mounting collar having two diametrically opposed openings, each provided with clamping flanges as described hereinabove, may be utilized. Apertures 43 receive assembly studs 26 for affixing latching plate 30 in the same manner as described hereinabove. Open-ended axle slot 42 is dimensioned and positioned in the same manner as axle slot 22 described hereinabove and functions in a manner similar thereto. Latching plate 30 is as described hereinabove in reference to FIGS. 5 and 6.

Figure 13:
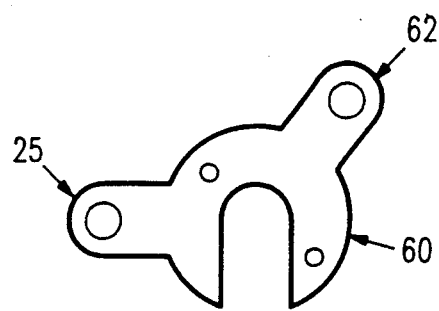
FIG. 13 is a front view of a third embodiment of the mounting plate of the mount of FIG. 2.
Figure 14:
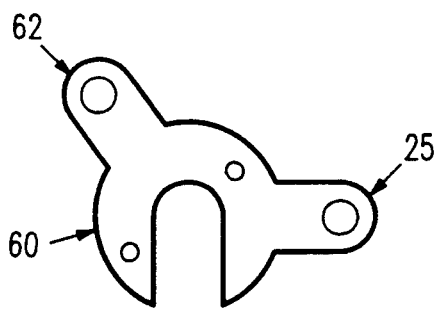
FIG. 14 is the reverse view of the mounting plate of FIG. 13.
Figure 15:
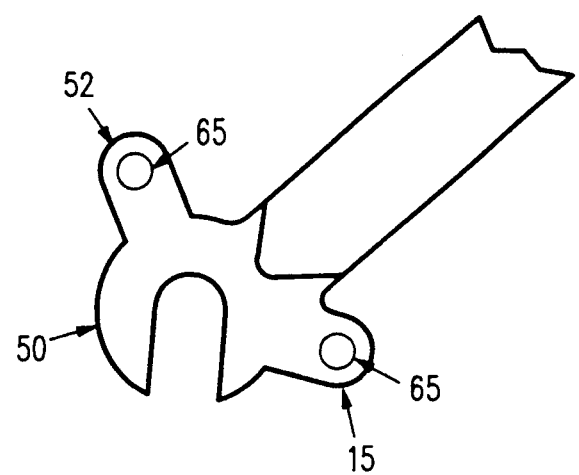
FIG. 15 is a perspective view of another type of bicycle front fork leg and integral dropout (Prior art).

Referring to FIGS. 13 and 14, a third embodiment of the mounting plate of the present invention is configured to conform to a different configuration of typical front fork leg shown in FIG. 15. In this configuration, dropout 50 includes lobes 15 and 50. To accommodate such a dropout configuration, mounting plate 60 now includes lobes 25 and 62 which conform to lobes 15 and 52, respectively, of dropout 50. As before with respect to dropout 11 of FIG. 7, holes 65 of lobes 15 and 52 of dropout 50 may be threaded to receive a bolt for attaching various accessories thereto. Holes 65 may be unthreaded as well, requiring the present invention to be attached with a suitable bolt and nut. Also as before, mounting of mounting plate 60 to dropout 50 does not interfere with attachment of accessories for which lobes 15 and 52 are provided.

The present invention has been described with reference to a preferred embodiment and one alternative embodiment. However, those skilled in the art and familiar with the disclosure of the present invention will recognize that changes in form and detail may be made without departing from the spirit of the invention, or exceeding the scope of the appended claims.

We claim:

1. A pair of mounting devices for receiving each end of the axle of a bicycle wheel having quick-release mounting hubs in cooperation with the open-ended axle receiving slot in the ends of each leg of the front fork of a bicycle, each of said mounting devices comprising:

a mounting means having an open-ended axle slot and a mounting aperture therethrough for mounting said mounting means to said end of said leg and for aligning said axle slot with the open-ended axle receiving slot in the end of said fork leg;

latching means having an open-ended axle slot and an arcuate aperture therethrough said open-ended axle slot of said latching means positioned to align with said open-ended axle receiving slot in the end of said fork leg; and fastening means passing through said arcuate aperture in said latching means for securing said latching means to said mounting means.

2. A pair of mounting devices as in claim 1 wherein:

said fastening means includes pivot means for said latching means, said open-ended axle slot in said latching means forming a load-bearing surface when closed in cooperation with said pivot means.

3. A pair of safety mounting devices as in claim 1 wherein:

said mounting means includes a mounting collar positioned for coupling said device to said bicycle fork leg and for aligning said axle slot with said open-ended axle receiving slot in the ends of said fork leg;

said mounting collar having two clamping flanges for affixing said mounting means to said leg;

said latching means having an open-ended axle slot and an arcuate aperture therethrough positioned so as to align said latching means axle slot with said open-ended axle receiving slot in said fork leg, and further having a load-bearing surface when closed in cooperation with said pivot means; and said fastening means passing through said arcuate aperture in said latching means for securing said latching means to said mounting means and for limiting the rotation of said latching means.

4. A safety mounting device as in claim 1 wherein said mounting means and said latching means are constructed of metal.

5. A safety mounting device as in claim 1 wherein:

said fastening means having a head and a stem, said head being larger than said arcuate aperture so that said fastening means does not pass therethrough; and the cross-section of the head of said fastening means is tapered.

6. A safety mounting device as in claim 5 wherein the cross-section of the head of said fastening means is T-shaped.

7. A safety mounting device as in claim 5 wherein:

the cross-section of said arcuate aperture is formed to conform to the taper of the head of said fastening means.

8. A safety mounting device as in claim 6 wherein the cross-section of said arcuate aperture is formed to conform to the T-shape of the head of said fastening means.

* * * * *